US012693576B2

(12) United States Patent
Mosayebi et al.

(10) Patent No.: US 12,693,576 B2
(45) Date of Patent: Jul. 28, 2026

(54) ADJUSTABLE FOCUS LENS MODULE

(71) Applicant: GoPro, Inc., San Mateo, CA (US)

(72) Inventors: Mahshad Mosayebi, Palo Alto, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 356 days.

(21) Appl. No.: 18/384,499

(22) Filed: Oct. 27, 2023

(65) Prior Publication Data

US 2025/0138395 A1 May 1, 2025

(51) Int. Cl.
G03B 13/34 (2021.01)
G02B 7/02 (2021.01)

(52) U.S. Cl.
CPC ............. G03B 13/34 (2013.01); G02B 7/026 (2013.01)

(58) Field of Classification Search
CPC . G02B 7/102; G02B 7/14; G02B 7/02; G02B 7/022; G02B 7/10; G02B 7/08; G02B 7/04; G02B 7/021; G02B 7/026; G02B 7/023; G03B 7/00; G03B 17/14; G03B 17/08; H04N 23/55
See application file for complete search history.

(56) References Cited

U.S. PATENT DOCUMENTS 4,293,185 A * 10/1981 Yamazaki ................ G02B 7/14
359/425
5,483,384 A 1/1996 Takizawa

| 7,561,353 B2 * | 7/2009 | Shirakata | ............... G02B 7/102 |
| | | | 359/821 |
| 9,477,064 B1 | 10/2016 | Chen | |
| 9,609,195 B2 | 3/2017 | Czepowicz | |
| 10,701,249 B1 | 6/2020 | Guo | |
| 10,969,660 B2 | 4/2021 | Cotoros | |
| 11,425,286 B2 | 8/2022 | Vitale | |
| 11,606,488 B2 | 3/2023 | Vitale | |
| 11,647,270 B2 | 5/2023 | Vitale | |
| 2002/0130963 A1 | 9/2002 | Gelbard | |

(Continued)

FOREIGN PATENT DOCUMENTS

| CN | 216595712 U | 5/2022 |
| KR | 100733047 B1 | 9/2006 |

(Continued)

OTHER PUBLICATIONS

International Search Report for Application No. PCT/US2019/058061, dated Jan. 30, 2020, 9 pages.

*Primary Examiner* — Ephrem Z Mebrahtu

(74) *Attorney, Agent, or Firm* — Young Basile Hanlon & MacFarlane. P.C.

(57) ABSTRACT

An image capture device includes a lens barrel disposed in a body of the image capture device and an adjustable lens module coupled to the lens barrel. The adjustable lens module includes a housing, an external ring, an internal ring, and an internal movable barrel. The external ring is coupled to the housing and configured to rotate about an optical axis. The internal ring is coupled to the housing and configured to rotate about the optical axis based upon rotation of the external ring about the optical axis. The internal movable barrel includes a movable internal lens, is coupled to the internal ring, and is configured to move axially along the optical axis based upon rotation of the internal ring.

20 Claims, 11 Drawing Sheets

(56) References Cited

U.S. PATENT DOCUMENTS

| | | |
|---|---|---|
| 2005/0030410 A1 | 2/2005 | Tsukatani |
| 2005/0099520 A1 | 5/2005 | Cheng |
| 2007/0133977 A1 | 6/2007 | Mayumi |
| 2009/0147377 A1 | 6/2009 | Polyakov |
| 2010/0165188 A1 | 7/2010 | Jannard |
| 2011/0273777 A1 | 11/2011 | Koyama |
| 2013/0111464 A1 | 5/2013 | Markas |
| 2013/0128104 A1 | 5/2013 | Nunnink |
| 2013/0129335 A1 | 5/2013 | Gainer |
| 2013/0182179 A1 | 7/2013 | Page |
| 2013/0343735 A1 | 12/2013 | Zhang |
| 2014/0072293 A1 | 3/2014 | Ono |
| 2014/0098225 A1 | 4/2014 | Rodriguez |
| 2014/0160304 A1 | 6/2014 | Galor |
| 2015/0293430 A1 | 10/2015 | O'Neill |
| 2016/0174408 A1 | 6/2016 | Tolbert |
| 2016/0274338 A1 | 9/2016 | Davies |
| 2016/0349601 A1 | 12/2016 | Kungl |
| 2017/0062303 A1 | 3/2017 | Lee |
| 2017/0064159 A1 | 3/2017 | Lee |

| | | | |
|---|---|---|---|
| 2017/0102513 A1 | 4/2017 | Ogata | |
| 2017/0111559 A1 | 4/2017 | Abbas | |
| 2017/0223239 A1 | 8/2017 | Petty | |
| 2018/0088443 A1 | 3/2018 | Riddiford | |
| 2018/0143514 A1 | 5/2018 | Campbell | |
| 2018/0224717 A1 | 8/2018 | Matsuzawa | |
| 2019/0187406 A1* | 6/2019 | Hattori | G02B 7/102 |
| 2019/0278045 A1 | 9/2019 | Manushi | |
| 2020/0096783 A1 | 3/2020 | Togawa | |
| 2020/0133095 A1 | 4/2020 | Cotoros | |
| 2021/0255525 A1 | 8/2021 | Cotoros | |
| 2022/0353400 A1 | 11/2022 | Vitale | |
| 2022/0400192 A1 | 12/2022 | Vitale | |
| 2022/0400196 A1 | 12/2022 | Vitale | |
| 2023/0209166 A1 | 6/2023 | Vitale | |
| 2025/0028229 A1 | 1/2025 | Griggs | |
| 2025/0060654 A1 | 2/2025 | Platner | |

FOREIGN PATENT DOCUMENTS

| | | | |
|---|---|---|---|
| KR | 20160015880 A | 2/2016 |
| WO | 2013058469 A1 | 4/2013 |

* cited by examiner

FIG. 6

ADJUSTABLE FOCUS LENS MODULE

TECHNICAL FIELD

This disclosure relates to an optical system, and more specifically, to an image capture device that includes an adjustable focus lens module.

BACKGROUND

Typical cameras may include one or more lenses so that images may be taken through the lenses (e.g., using one or more image sensors). The lenses may be connected within an image capture device so that alignment of the lenses is maintained. The lenses may be connected to a frame or to each other so that proper alignment is achieved and maintained. The lenses may also be fixed in place to prevent misalignment when the image capture device is dropped or impacted, thereby constraining adjustability of the lenses. It may be difficult to capture clear images or videos due to the lack of adjustability, thereby preventing a user from focusing one or more of the lenses.

SUMMARY

In one implementation, an image capture device includes a lens barrel disposed in a body of the image capture device and an adjustable lens module coupled to the lens barrel. The adjustable lens module includes a housing, an external ring, an internal ring, and an internal movable barrel. The external ring is coupled to the housing and configured to rotate about an optical axis. The internal ring is coupled to the housing and configured to rotate about the optical axis based upon rotation of the external ring about the optical axis. Additionally, the internal movable barrel includes a movable internal lens, is coupled to the internal ring, and is configured to move axially along the optical axis based upon rotation of the internal ring.

In certain implementations, the internal movable barrel may be configured to move axially towards and away from the lens barrel along the optical axis based upon rotation of the internal ring.

In certain implementations, the external ring and the internal ring may be coupled to a knob located therebetween, and the knob may be configured to rotate the internal ring about the optical axis based upon rotation of the external ring. Additionally, the knob may include a first engaging portion that is configured to engage teeth of the external ring and a second engaging portion that is configured to engage teeth of the internal ring. Moreover, the knob may extend through a hole of the housing to engage both the external ring and the internal ring. The knob may be configured to rotate about an axis of rotation based upon rotation of the external, and wherein the axis of rotation is substantially orthogonal to the optical axis.

In certain implementations, the adjustable lens module may further include an internal fixed barrel that is disposed in the housing and positioned outward along the optical optical axis from the internal movable barrel with respect to the lens barrel of the image capture device. The adjustable lens module may also include a mounting plate that is configured to couple the adjustable lens module to the lens barrel. The mounting plate may be coupled to housing of the adjustable lens module and configured to engage a bayonet of the lens barrel. Additionally, the mounting plate may include a lip that is configured to engage one or more fingers of the bayonet to couple the adjustable lens module to the lens barrel.

In certain implementations, the adjustable lens module may be coupled to the lens barrel so that the adjustable lens module and the lens barrel are axially aligned along the optical axis. Additionally, the housing of the adjustable lens module may include an annular groove that is configured to receive a male portion of the external ring so that, during rotation of the external ring about the optical axis, the male portion of the external ring may be guided along the annular groove.

In another implementation, an adjustable lens module for an image capture device includes an internal movable, a movable internal lens disposed in the internal movable barrel, and a ring coupled to the internal movable barrel. The movable internal lens is configured to axially align with an optical axis of a lens barrel of the image capture device and configured to be positioned inward of an outer surface of the adjustable lens module. Additionally, the ring is configured to rotate with respect to the internal movable barrel about the optical axis of the lens barrel. Rotation of the ring is configured to move the internal movable barrel and the movable internal lens axially along the optical axis of the lens barrel.

In certain implementations, the adjustable lens module may further include a housing. The internal movable barrel and the ring may be disposed within the housing. Additionally, the housing may be configured to remain stationary when the ring is rotated and when the internal movable barrel moves axially along the optical axis. Moreover, the housing may be configured to be coupled to the lens barrel.

In certain implementations, the internal movable barrel may be configured to move axially towards and away from the lens barrel along the optical axis based upon rotation of the ring. Additionally, the adjustable lens module may further include a knob that is configured to engage the ring. Rotation of the knob may be configured to rotate the ring about the optical axis.

In another implementation, an image capture device includes a barrel disposed in a body of the image capture device and an adjustable lens module coupled to the lens barrel. The lens barrel includes one or more lenses disposed in the lens barrel. The adjustable lens module includes an internal fixed barrel that includes one or more fixed internal lenses, an internal movable barrel, a movable internal lens disposed in the internal movable barrel, a ring coupled to the internal movable barrel, and an annular biasing element disposed between the internal movable barrel and the internal fixed barrel. The one or more fixed internal lenses axially align with the one or more lenses of the lens barrel along an optical axis of the lens barrel. Additionally, the movable internal lens axially aligns with the one or more lenses of the lens barrel along the optical axis of the lens barrel. Moreover, the ring is configured to rotate with respect to the internal movable barrel about the optical axis. Rotation of the ring is configured to move the internal lens axially towards and away from the one or more lenses of the lens barrel along the optical axis. Furthermore, the annular biasing element is configured to bias the internal movable barrel against the lens barrel of the image capture device.

In certain implementations, the annular biasing element may be a wave spring. Additionally, the internal fixed barrel may include a projection that extends into a hole of the internal movable barrel to axially align the internal fixed barrel and the internal movable barrel along the optical axis. A radial biasing element may be disposed in the hole of the internal movable barrel to bias the internal fixed barrel and maintain axial alignment between the internal fixed barrel and the internal movable barrel along the optical axis.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an isometric exploded view of an adjustable lens module.

DETAILED DESCRIPTION

An adjustable lens module is configured to connect to an image capture device. The image capture device may include one or more lenses that are fixed within the image capture device (e.g., internal lenses integrated with, or coupled to, a lens barrel of the image capture device) and one or more lenses that are removable, interchangeable, or both (e.g., lenses of the adjustable lens module). The adjustable lens module may be located in front of, or external to, the lenses that are fixed within the image capture device. The adjustable lens module may be removed from the image capture device for replacement or modification, and then recoupled to the image capture device. The adjustable lens module may be completely or partially sealed with respect to the image capture device.

In order for images or videos to be captured, the adjustable lens module and the internal lenses of the image capture device are aligned along an optical axis. The adjustable lens module and the internal lenses of the image capture device may be subject to build tolerances that, if not followed, could cause misalignment and negatively impact capture of the images or videos. Additionally, if the image capture device is accidentally dropped or impacted, the adjustable lens module may be damaged or may become misaligned with the internal lenses, thereby negatively impacting the capture of the images or the videos. Furthermore, the internal lenses of the image capture device and the adjustable lens module, once coupled to the image capture device, are often fixed in place (e.g., fixed to the lens barrel) to prevent misalignment. As a result, lenses of the image capture device and the adjustable lens module are unable to be adjusted to adjust focus of an image or video to be captured by the image capture device.

An adjustable lens module is described herein that achieves and/or maintains proper alignment between the internal lenses of the image capture device and the lenses of the adjustable lens module so that the images or videos captured are clear and complete without distortion. Furthermore, the adjustable lens module may facilitate adjustability of one or more lenses within the adjustable lens module to adjust focus of the image or video to be captured. That is, one or more lenses of the adjustable lens module may be movable with respect to the internal lenses of the image capture device when the adjustable lens module is coupled to the image captured device. The movable lenses within the adjustable lens module may still maintain proper alignment with the internal lenses of the image capture device. Additionally, the adjustable lens module may movably couple to the image capture device to facilitate interchangeability and/or replacement of the adjustable lens module.

Figure 1A:
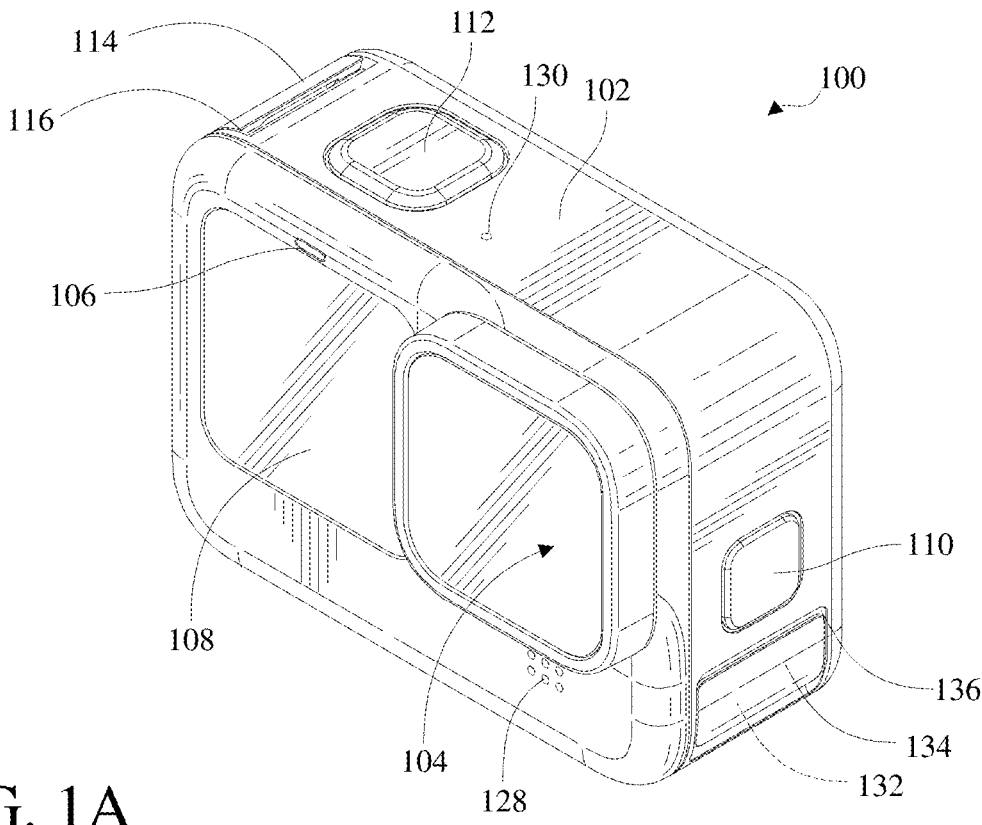
FIGS. 1A-1B are isometric views of an example of an image capture apparatus.
Figure 1B:
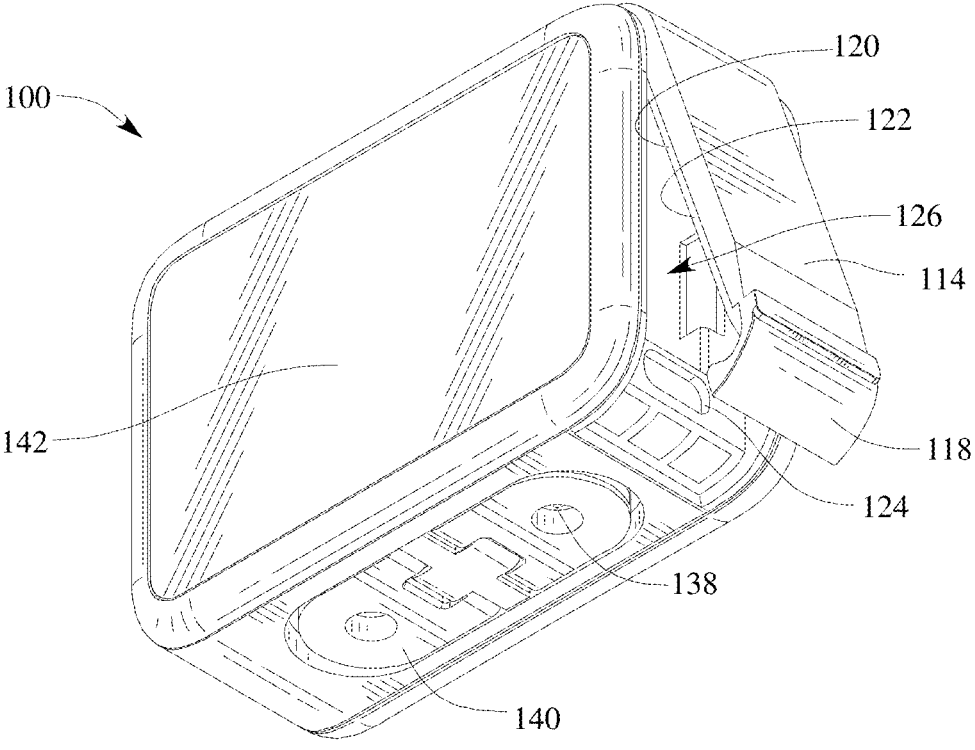
Figure 5:
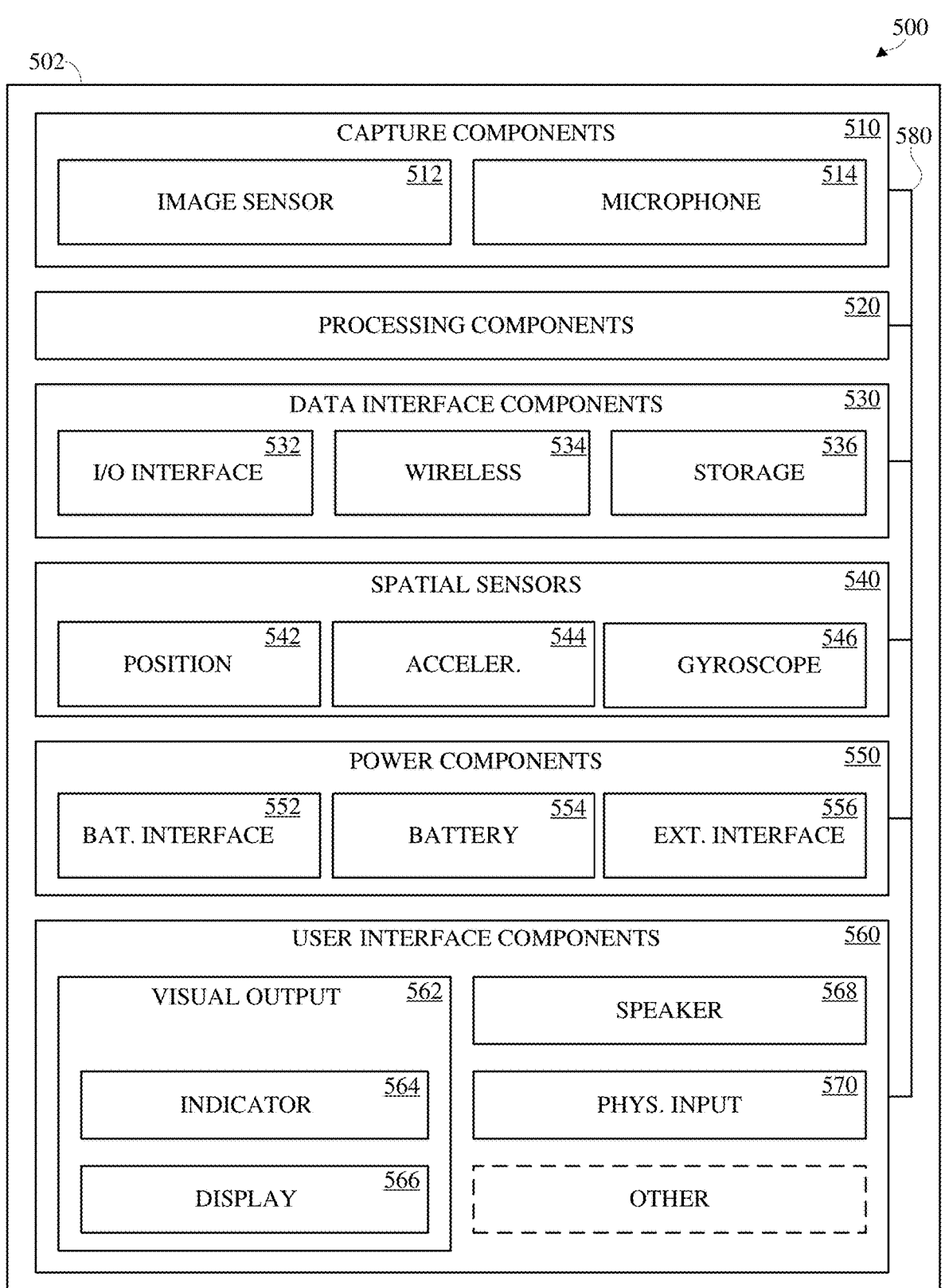
FIG. 5 is a block diagram of electronic components of an image capture apparatus.

FIGS. 1A and 1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A and 1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A and 1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A and 1B. In some implementations, the display 142 may be omitted or combined with another component of the image capture apparatus 100.

7

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
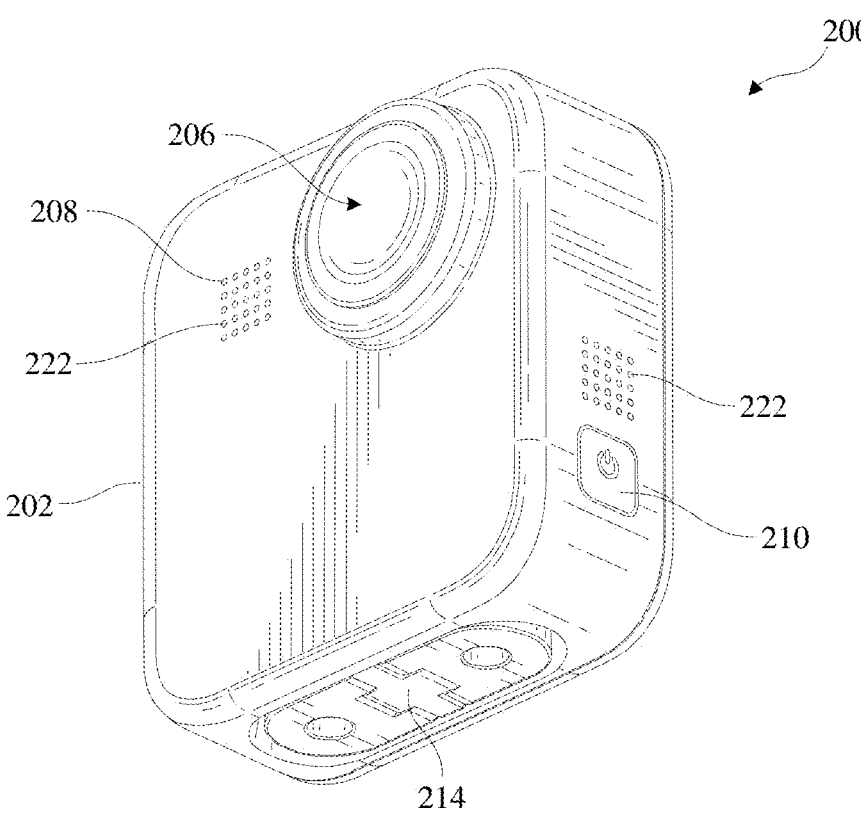
FIGS. 2A-2B are isometric views of another example of an image capture apparatus.
Figure 2B:
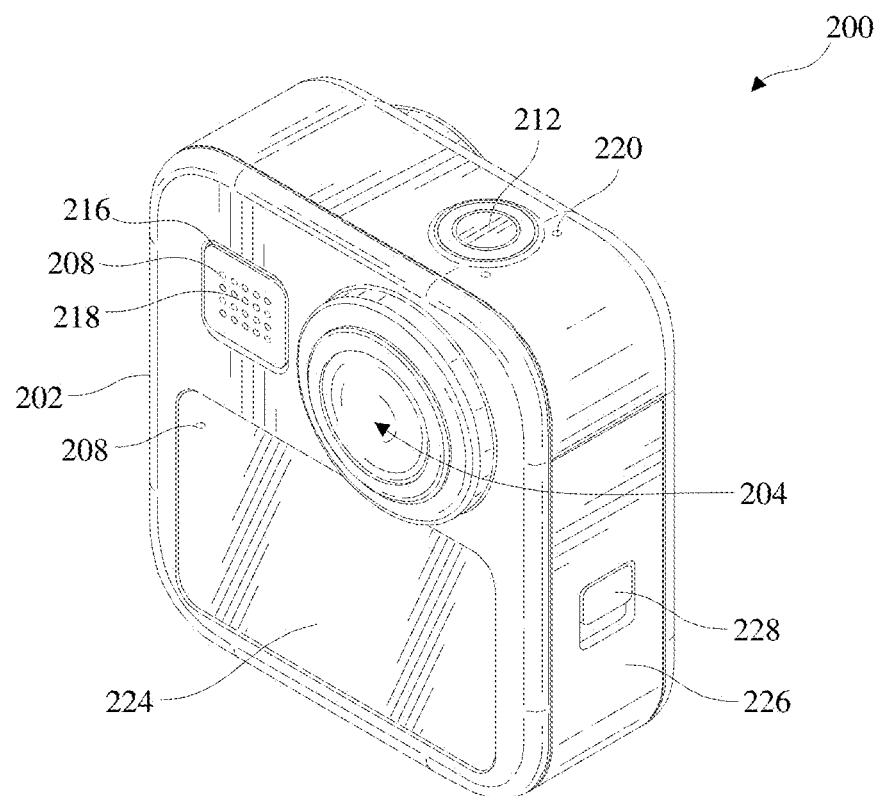

FIGS. 2A and 2B illustrate another example of an image capture apparatus 200. The image capture apparatus 200 is similar to the image capture apparatus 100 shown in FIGS. 1A and 1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A and 1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A and 2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A and 2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A and 2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A and 1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A and 2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
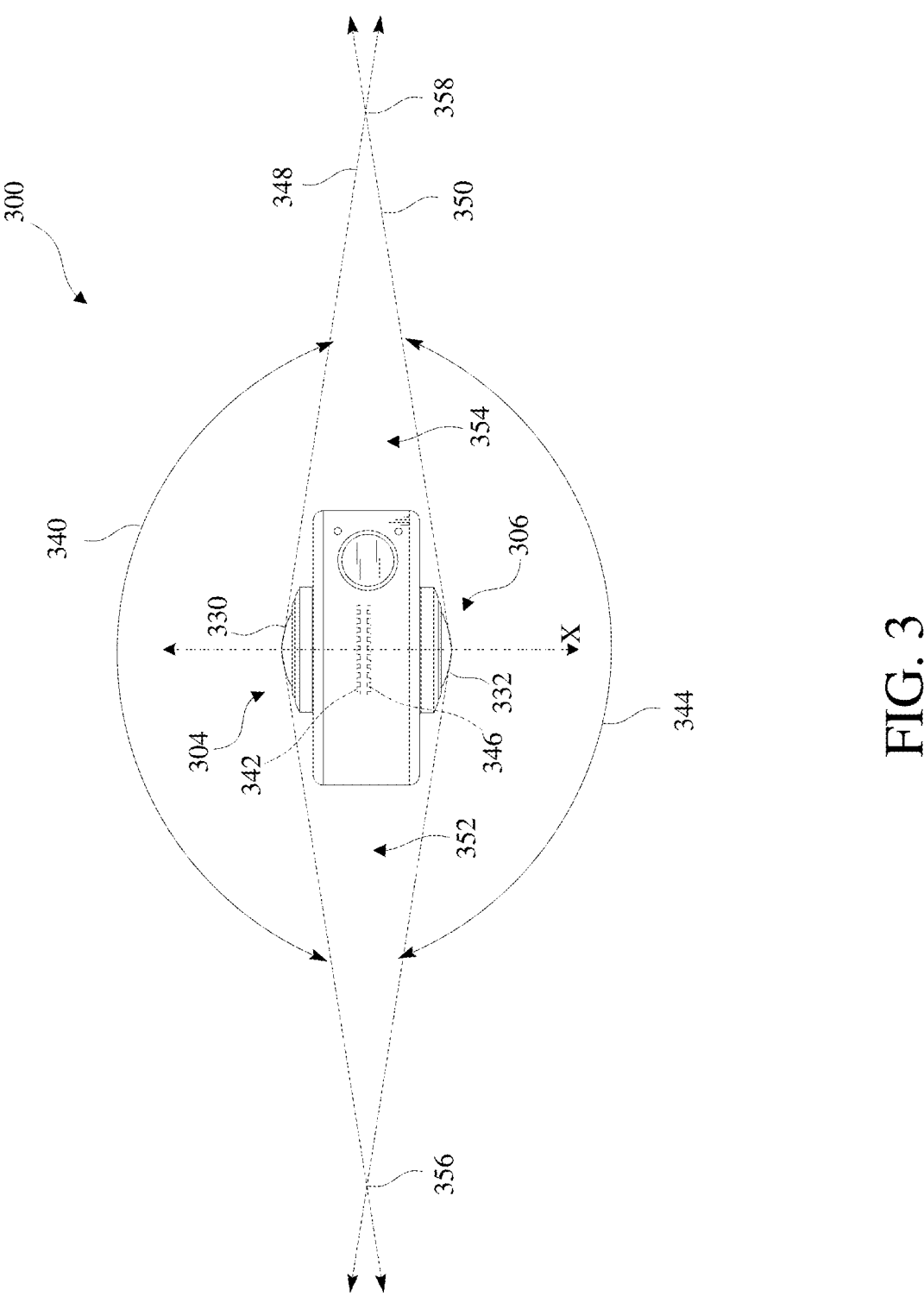
FIG. 3 is a top view of another example of an image capture apparatus.

FIG. 3 is a top view of an image capture apparatus 300. The image capture apparatus 300 is similar to the image capture apparatus 200 of FIGS. 2A and 2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
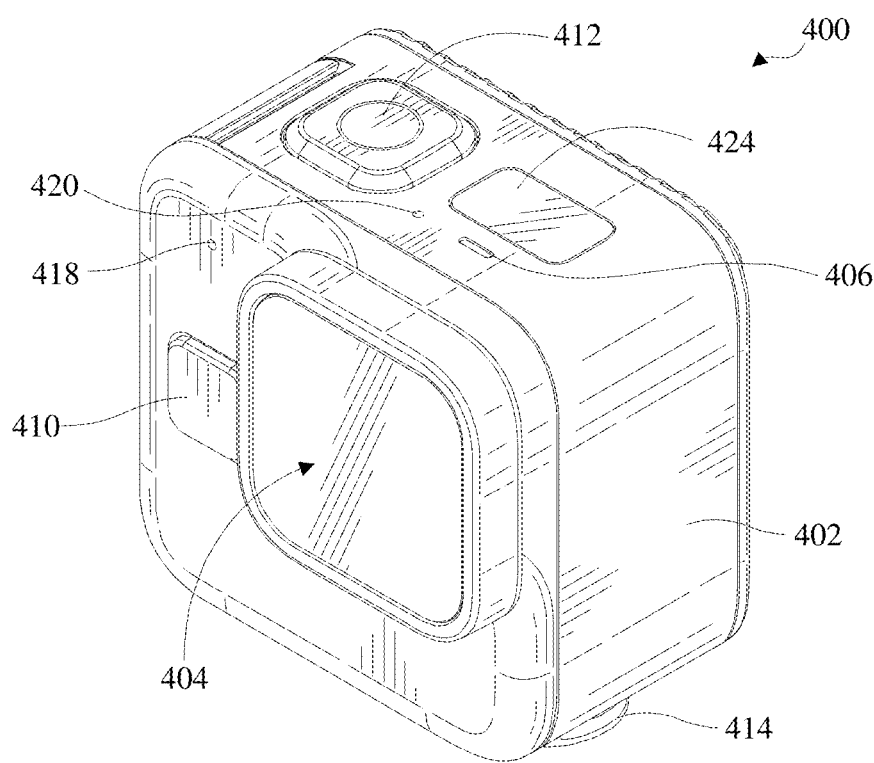
FIGS. 4A-4B are isometric views of another example of an image capture apparatus.
Figure 4B:
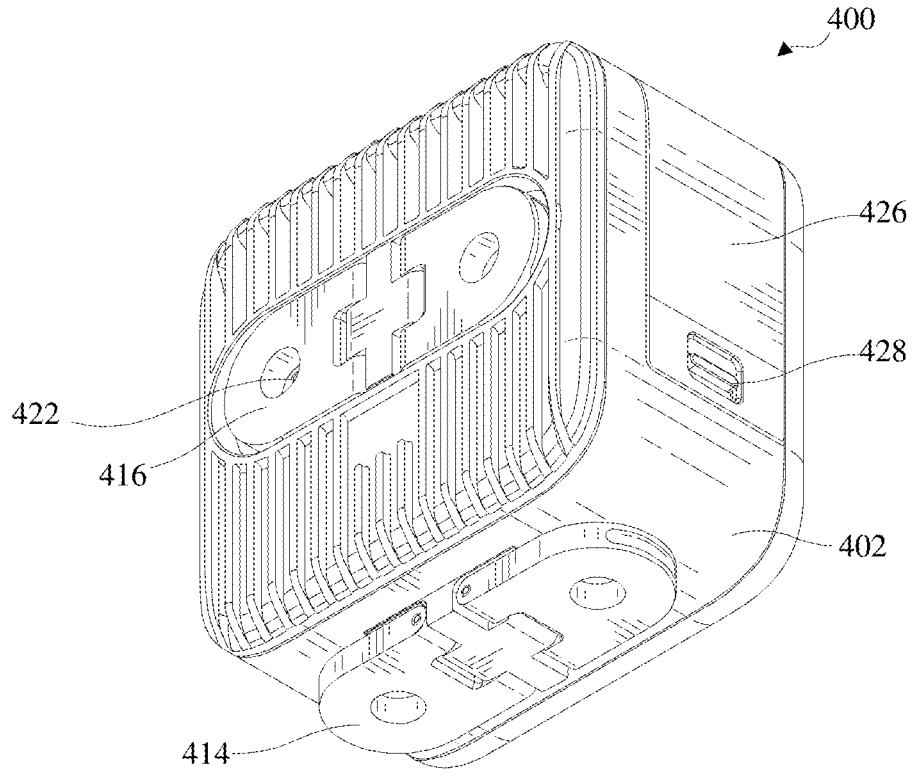

FIGS. 4A and 4B illustrate another example of an image capture apparatus 400. The image capture apparatus 400 is similar to the image capture apparatus 100 shown in FIGS. 1A and 1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A and 1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIG. 4A, the image capture apparatus 400 may include other indictors structured on respective surfaces of the body 402.

As shown in FIG. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A and 4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A and 4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A and 1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A and 4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A and 1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A and 1B, the image capture apparatus 200 shown in FIGS. 2A and 2B, the image capture apparatus 300 shown in FIG. 3, or the image capture apparatus 400 shown in FIGS. 4A and 4B, may be implemented as shown in FIG. 5.

The image capture apparatus 500 includes a body 502. The body 502 may be similar to the body 102 shown in FIGS. 1A and 1B, the body 202 shown in FIGS. 2A-2B, or the body 402 shown in FIGS. 4A and 4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A and 1B, the audio components 218, 220, 222 shown in FIGS. 2A and 2B, or the audio components 418, 420, 422 shown in FIGS. 4A and 4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A and 2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A and 2B, or the audio components 418, 420, 422 shown in FIGS. 4A and 4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
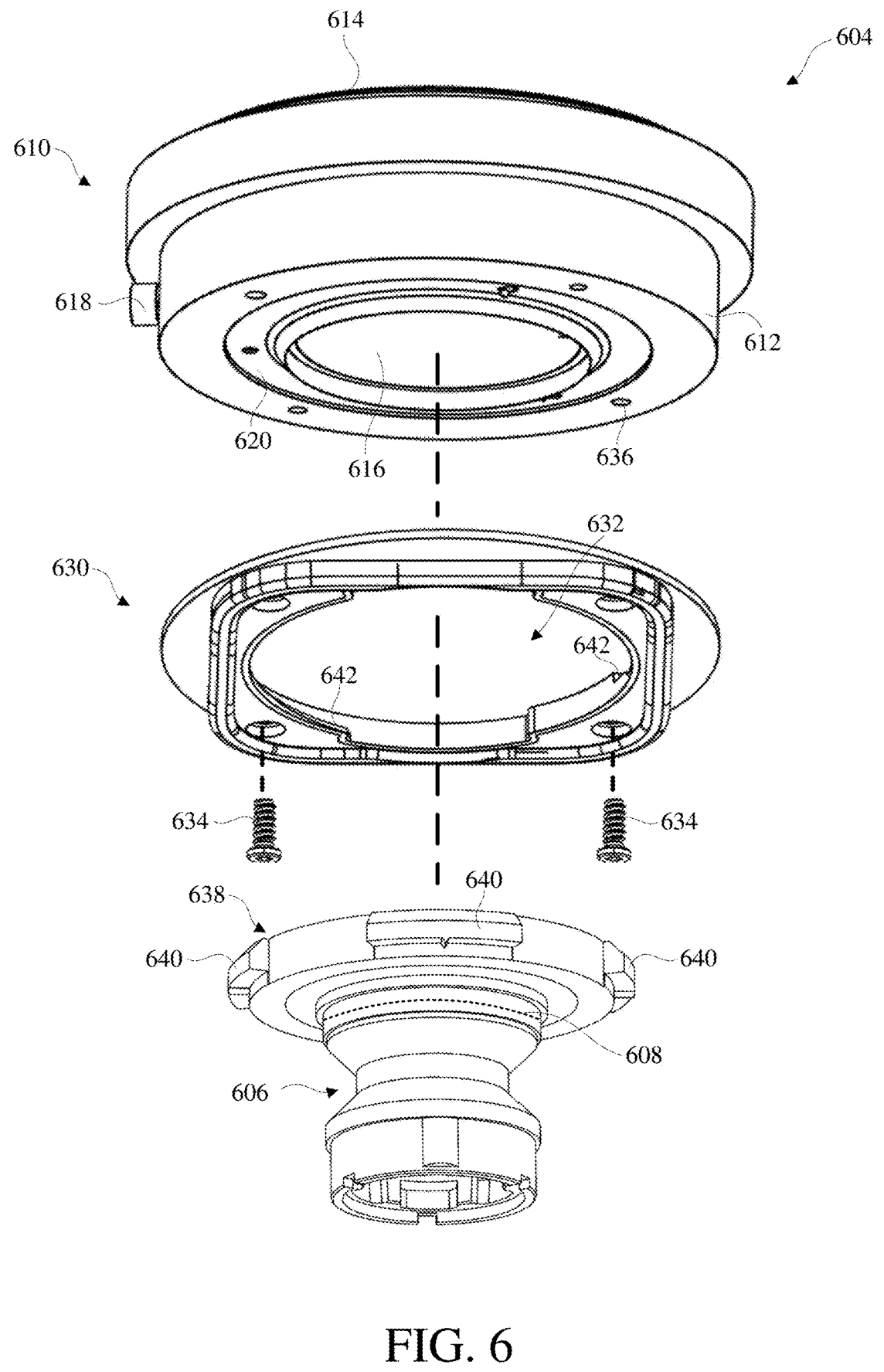

FIG. 6 is an exploded isometric view of an image capture device 604. The image capture device 604 may be similar to the image capture devices 104, 204, 206, 304, 306, 404 described above. A portion of the image capture device 604 (e.g., a body of the image capture device 604 similar to the body 102 or the body 202) has been removed from the exploded isometric view for clarity and simplicity.

The image capture device 604 may include a lens barrel 606. The lens barrel 606 may be disposed in a body of the image capture device 604. The lens barrel 606 may include one or more internal lenses disposed in the lens barrel 606, such as lens 608 illustrated in FIG. 6 as a dashed line. The one or more internal lenses of the lens barrel 606, such as the lens 608, may be axially aligned along an optical axis of the lens barrel 606.

The image capture device 604 may include an adjustable lens module 610 that may be coupled to the lens barrel 606. The adjustable lens module 610 may be configured to removably couple to the lens barrel 606, either directly or indirectly, to facilitate replacement of the adjustable lens module 610 and/or interchangeability of the adjustable lens module 610 with one or more additional lens modules. As such, the adjustable lens module 610 may provide further customization of the image capture device 604 to facilitate capturing images and videos in a variety of manners.

The adjustable lens module 610 may include a housing 612, an external lens 614, and a movable internal lens 616. When the adjustable lens module 610 is coupled to the lens barrel 606, the external lens 614 may positioned outward of the movable internal lens 616 with respect to the lens barrel 606 along the optical axis of the lens barrel 606. The external lens 614 may be coupled to the housing 612 and fixed to the housing 612. That is, the external lens 614 may be configured to maintain its position during operation of the image capture device 604. Additionally, the movable internal lens 616 and the external lens 614 may be axially aligned with one another, may be axially aligned with the lens 608 disposed in the lens barrel 606, or both.

The movable internal lens 616 may be configured to move axially toward and away from the external lens 614. A knob 618 of the adjustable lens module 610 may extend through the housing 612 and may be configured to engage, either directly or indirectly, an internal movable barrel 620 within the housing 612. The movable internal lens 616 may be coupled to the internal movable barrel 620 so that, when the knob 618 is rotated (e.g., manually rotated by a user of the image capture device 604), the knob 618 may in turn move the internal movable barrel 620 along a longitudinal axis of the adjustable lens module 610 (e.g., the optical axis of the lens barrel 606 once the adjustable lens module 610 is coupled to the lens barrel 606). As a result, the movable internal lens 616 may move axially toward and/or away from the external lens 614 along the longitudinal axis of the adjustable lens module 610. Thus, a user may be able to manually adjust a position of the movable internal lens 616 to adjust the focus of an image or video being captured through the adjustable lens module 610 and the lens barrel 606, thereby providing further functionality to the image capture device 604.

The adjustable lens module 610 may further include a mounting plate 630 that may be configured to couple the adjustable lens module 610 to the lens barrel 606. The mounting plate 630 may directly or indirectly couple the adjustable lens module 610 to the lens barrel 606. For example, the mounting plate 630 may couple the adjustable lens module 610 to an intermediary component located between the lens barrel 606 and the adjustable lens module 610. Alternatively, the mounting plate 630 may be coupled directly to a surface or engaging feature of the lens barrel 606.

The mounting plate 630 may be coupled to the adjustable lens module 610 in any desired manner. For example, the mounting plate 630 may include an opening 632 that is configured to receive and/or align with the movable internal lens 616 of the adjustable lens module 610 to ensure that the mounting plate 630 does not obstruct a region between the movable internal lens 616 and the lens 608 of the lens barrel 606. The mounting plate 630 may be coupled to the housing 612 of the adjustable lens module 610 using one or more fasteners 634 that may extend through the mounting plate 630 (e.g., through fastener holes in the mounting plate 630) and into mounting holes 636 of the housing 612 of the adjustable lens module 610. The mounting plate 630 may also be coupled to the housing 612 free of the fasteners 634, such as by using an adhesive.

The mounting plate 630 may be coupled to the housing 612 of the adjustable lens module 610 and may be config- ured to engage a bayonet 638 of the lens barrel 606. The mounting plate 630 may be configured to couple to one or more fingers 640 of the bayonet 638. For example, the mounting plate 630 may include a lip 642 that is configured to engage the one or more fingers 640 of the bayonet 638 to couple the adjustable lens module 610 to the lens barrel 606. Such engagement between the lip 642 of the mounting plate 630 and the lens barrel 606 may facilitate easy disconnection of the adjustable lens module 610 from the lens barrel 606 to allow for replacement of the adjustable lens module 610 and/or interchangeability of the adjustable lens module 610 with other lens modules.

Figure 7:
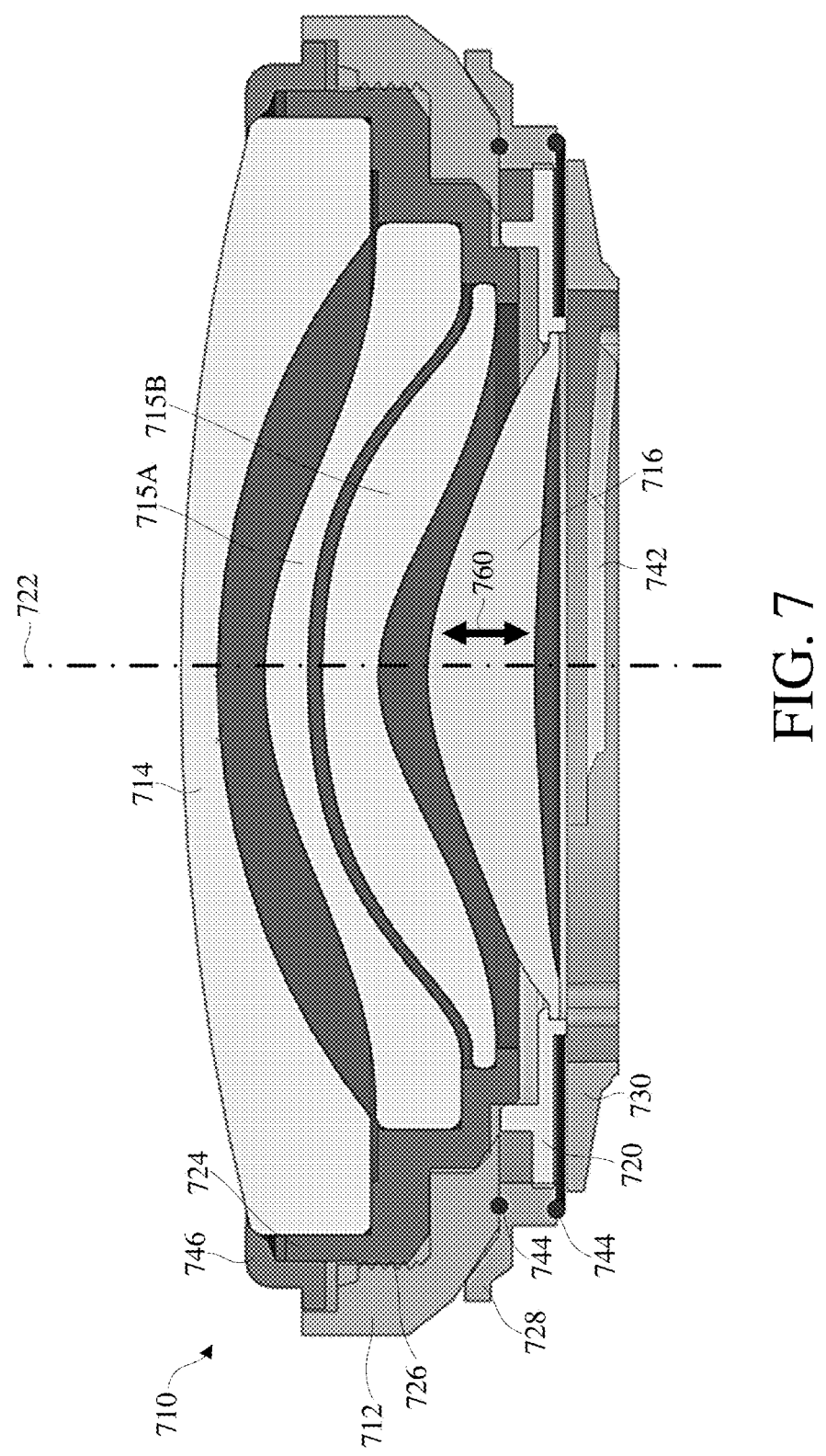
FIG. 7 is a cross-sectional view of an adjustable lens module.

FIG. 7 is a cross-sectional view of an adjustable lens module 710. The adjustable lens module 710 may be similar to the adjustable lens module 610 described with respect to FIG. 6. Additionally, the adjustable lens module 710 may be coupled to a lens barrel, such as the lens barrel 606 of FIG. 6.

The adjustable lens module 710 includes a housing 712, an external lens 714, a first fixed internal lens 715A, a second fixed internal lens 715B, and a movable internal lens 716 disposed within the housing 712. The external lens 714, the first fixed internal lens 715A, and the second fixed internal lens 715B may remain stationary during operation of the adjustable lens module 710. The movable internal lens 716 may be similar to the movable internal lens 616. The movable internal lens 716 may be configured to move within the housing 712 with respect to the external lens 714, the first fixed internal lens 715A, and the second fixed internal lens 715B.

The adjustable lens module 710 may include an internal movable barrel 720 that includes the movable internal lens 716. That is, the movable internal lens 716 may be coupled to the internal movable barrel 720. The internal movable barrel 720 may be configured to move axially along an optical axis 722 to move a position of the movable internal lens 716. The adjustable lens module 710 may be coupled to the lens barrel (e.g., the lens barrel 606 of FIG. 6) so that the adjustable lens module 710 is axially aligned with the lens barrel along the optical axis 722, thereby also aligning the movable internal lens 716 with one or more lenses of the lens barrel (e.g., the lens 608 of FIG. 6). That is, the movable internal lens 716 may be disposed in the internal movable barrel 720 of the adjustable lens module 710 so that the movable internal lens 716 axially aligns with one or more lenses (e.g., the lens 608 of FIG. 6) of the lens barrel along the optical axis 722 of the lens barrel.

Additionally, the movable internal lens 716 may be con- figured to be positioned inward of an outer surface of the adjustable lens module 710, such as the outer or exterior surface of the external lens 714. As a result, the movable internal lens 716 may be positioned between the external lens 714 and the lens barrel. As shown in FIG. 7, the movable internal lens 716 may be positioned inward of the first fixed internal lens 715A and the second fixed internal lens 715B when the adjustable lens module 710 is coupled to the image capture device (e.g., inward with respect to translation along the optical axis 722). Therefore, the mov- able internal lens 716 may be configured to move within the adjustable lens module 710 and be protected from moisture and/or debris that an exterior surface of the adjustable lens module 710 may be exposed to.

The adjustable lens module 710 may include an internal fixed barrel 724 that is disposed in the housing 712 and positioned outward along the optical axis 722 from the internal movable barrel 720 with respect to the lens barrel of the image capture device. The internal fixed barrel 724 may be at least partially disposed within the housing 712 and configured to remain stationary during movement of the internal movable barrel 720. The internal fixed barrel 724 may include one or more fixed lenses, such as the first fixed internal lens 715A and the second fixed internal lens 715B. The first fixed internal lens 715A and the second fixed internal lens 715B may thus also remain stationary during movement of the internal movable barrel 720 and may axially align with the one or more lenses (e.g., the lens 608 of FIG. 6) of the lens barrel along the optical axis 722 of the lens barrel.

The internal fixed barrel 724 may be coupled to the housing 712. The internal fixed barrel 724 may be mechani- cally coupled to the housing 712 or may be secured to the housing 712 in a different manner, such as by using one or more adhesives. By way of example, the internal fixed barrel 724 may include threading 726 that may threadably engage the housing 712. The housing 712 may include complemen- tary threading to the threading 726 of the internal fixed barrel 724 so that the internal fixed barrel 724 may be threaded into, and secured to, the housing 712. The housing 712 may also be free of threading so that the threading 726 of the internal fixed barrel 724 may function as a press-fit feature, whereby the threading 726 may engage an internal surface of the housing 712 and maintain a position of the internal fixed barrel 724 within the housing 712.

The adjustable lens module 710 may also include an external ring 728. The external ring 728 may be coupled to the housing 712 and may be configured to rotate about the optical axis 722. The external ring 728 may be coupled to the internal movable barrel 720 and configured to rotate with respect to the internal movable barrel 720 about the optical axis 722 of the lens barrel. Rotation of the external ring 728 about the optical axis 722 may move the internal movable barrel 720. For example, rotation of the external ring 728 may be configured to move the internal movable barrel 720 and the movable internal lens 716 axially along the optical axis 722 of the lens barrel towards and away from the second fixed internal lens 715B. That is, the internal movable barrel 720 may be configured to move towards and away from the lens barrel along the optical axis 722 based upon rotation of the external ring 728.

The external ring 728 may include threading that is configured to threadably engage the internal movable barrel 720 so that rotation of the external ring 728 about the optical axis 722 may guide the internal movable barrel 720 along the threading and thus along the optical axis 722. That is, the external ring 728 and the internal movable barrel 720 may be configured to translate rotation of the external ring 728 into linear movement of the internal movable barrel 720 along the optical axis 722. It should be noted that the external ring 728 may also be configured to engage the internal movable barrel 720 in other manners to move the internal movable barrel 720. For example, as discussed further with respect to FIG. 8, the external ring 728 may be coupled to an intermediate component such as an additional ring, whereby the intermediate component may be configured to move the internal movable barrel 720 based upon rotation of the external ring 728.

As stated above, rotation of the external ring 728 may cause the movable internal lens 716 to move along the optical axis 722. As a result, a user of the image capture device that includes the adjustable lens module 710 may adjust the focus of an image or video being captured by the image capture device through use of the adjustable lens module 710 and the lens barrel of the image capture device. That is, the movable internal lens 716 and the internal movable barrel 720 may be moved in a focus direction 760 along the optical axis 722 towards or away from the lens barrel to manually adjust the position of the movable internal lens 716 with respect to the lens barrel and with respect to the lenses of the adjustable lens module 710 (e.g., the external lens 714, the first fixed internal lens 715A, and the second fixed internal lens 715B). Thus, the adjustable lens module 710 may provide the user with further tunability of the image capture device to ensure that the image or video captured is clear or at a desired magnification. Additionally, due to the movable internal lens 716 being configured to move within the adjustable lens module 710, the movable internal lens 716 and the internal movable barrel 720 may be protected from environmental degradation caused by moisture and/or debris.

The adjustable lens module 710 may also include a mounting plate 730 that may be configured to couple the adjustable lens module 710 to the image capture device. For example, the mounting plate 730 may be similar to the mounting plate 630 described with respect to FIG. 6 such that a lip 742 of the mounting plate 730 may be configured to releasably couple to a bayonet (e.g., the bayonet 638 of FIG. 6) to secure the adjustable lens module 710 to the lens barrel of the image capture device. The mounting plate 730 may also be configured to couple the adjustable lens module 710 to another part of the image capture device other than the lens barrel, such as a housing of the image capture device.

The adjustable lens module 710 may also include one or more seals 744 that may be configured to seal gaps between components of the adjustable lens module 710. The seals 744 may be configured to prevent moisture and/or debris from reaching the internal portion of the adjustable lens module 710 where the internal movable barrel 720 and the movable internal lens 716 are located. For example, the seals 744 may be disposed between the external ring 728 and the housing 712 and between the external ring 728 and the mounting plate 730 to prevent moisture from entering therebetween. The seals 744 are not limited to any particular configuration. For example, the seals 744 may be a compressible material, may be an annular seal, or both. As a result, the seals 744 may seal the gaps between the external ring 728 and the housing 712 and between the external ring 728 and the mounting plate 730 while still allowing for moving of the internal movable barrel 720 within the adjustable lens module 710 in the focus direction 760.

The adjustable lens module 710 may provide a means to focus the image or video captured by the image capture device by adjusting a position of the movable internal lens 716 along the optical axis 722. During adjustment, the adjustable lens module 710 may maintain its overall position with respect to the image capture device and maintain connection between the image capture device and the adjustable lens module 710. That is, the adjustable lens module 710 may be coupled to the lens barrel during adjustment of the position of the movable internal lens 716, thereby preventing unwanted disconnection between the adjustable lens module 710 and the image capture device. Additionally, while the external ring 728 may be configured to rotate with respect to the optical axis 722, the housing 712 and the lenses of the adjustable lens module 710 other than the movable internal lens 716 may remain stationary during focusing (e.g., movement of the internal movable barrel 720). For example, the external lens 714 may be at least partially secured within the housing 712 by a retaining ring 746 that may maintain a position of the external lens 714 within the internal fixed barrel 724 and the housing 712. Additionally, the first fixed internal lens 715A and the second fixed internal lens 715B may be fixed to the internal fixed barrel 724 within the housing 712 so that the movable internal lens 716, the first fixed internal lens 715A, and the second fixed internal lens 715B may all maintain their axial position to ensure alignment between all lenses along the optical axis 722. As a result, unwanted movement of the lenses within the adjustable lens module 710 may be minimized.

Figure 8:
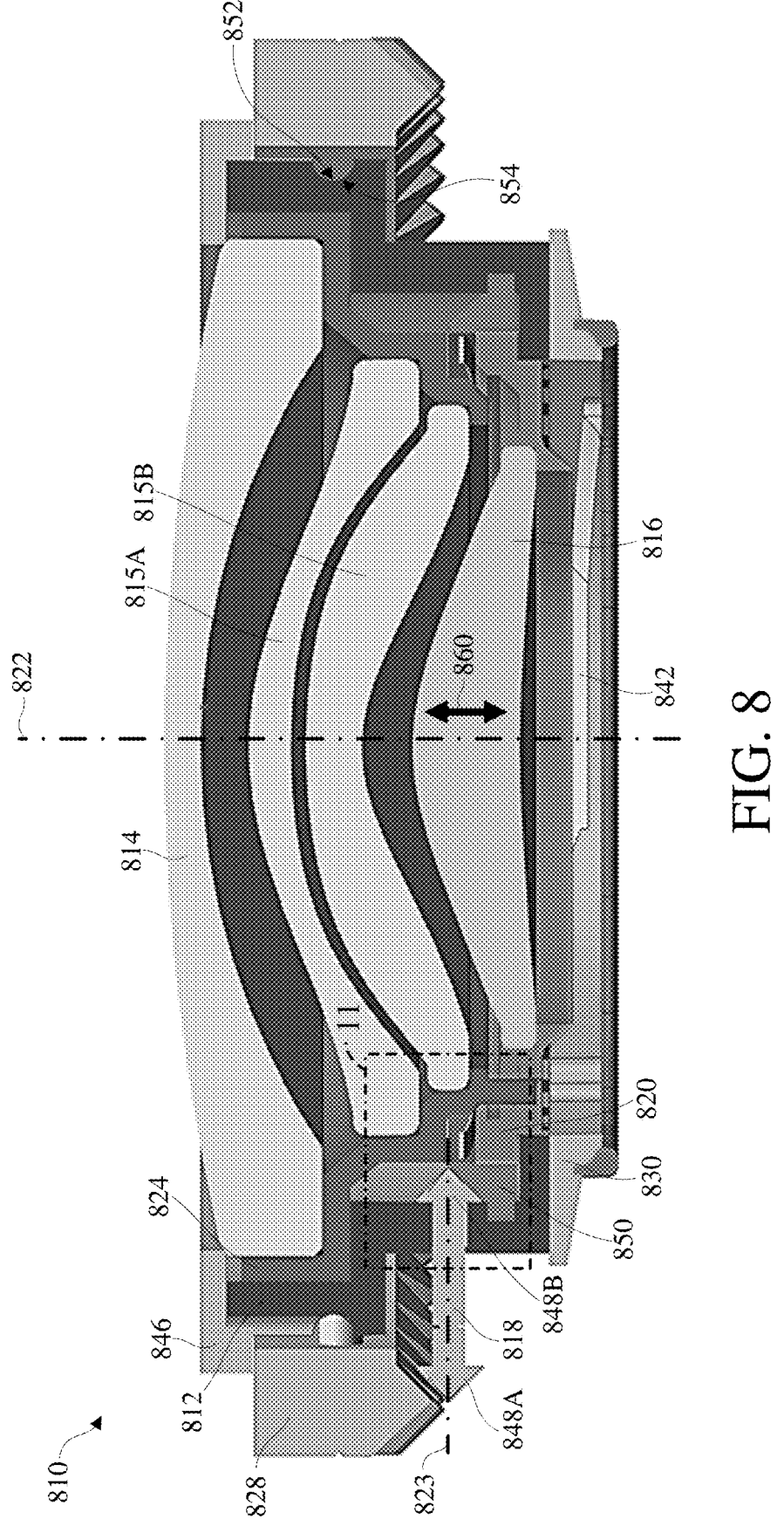
FIG. 8 is a cross-sectional view of an adjustable lens module.

FIG. 8 is a cross-sectional view of an adjustable lens module 810. The adjustable lens module 810 may be similar to the adjustable lens module 610 of FIG. 6 and the adjustable lens module 710 of FIG. 7. Additionally, the adjustable lens module 810 may be coupled to a lens barrel, such as the lens barrel 606 of FIG. 6.

The adjustable lens module 810 includes a housing 812, an external lens 814, a first fixed internal lens 815A, a second fixed internal lens 815B, and a movable internal lens 816 disposed within the housing 812. The external lens 814, the first fixed internal lens 815A, the second fixed internal lens 815B, and the housing 812 may remain stationary during operation of the adjustable lens module 810 (e.g., during movement of the movable internal lens 816). The movable internal lens 816 may be configured to move within the housing 812 based upon rotation of a knob 818 of the adjustable lens module 810 moving an internal movable barrel 820 along an optical axis 822 of the adjustable lens module 810.

The movable internal lens 816 may be coupled to the internal movable barrel 820 so that movement of the internal movable barrel 820 along the optical axis 822 may also move the movable internal lens 816 along the optical axis 822. Rotation of the knob 818 along an axis of rotation 823 may directly or indirectly cause linear movement of the internal movable barrel 820 and the movable internal lens 816 along the optical axis 822. As a result, the position of the movable internal lens 816 within the adjustable lens module 810 may be adjusted by a user to adjust the focus of an image or video being captured by the image capture device through the adjustable lens module 810.

The adjustable lens module 810 may also include an internal fixed barrel 824 that is disposed within the housing 812 and configured to remain stationary during movement of the internal movable barrel 820 and the movable internal lens 816. The internal fixed barrel 824 may maintain a position of the external lens 814, the first fixed internal lens 815A, and the second fixed internal lens 815B to ensure that the external lens 814, the first fixed internal lens 815A, and the second fixed internal lens 815B are axially aligned along the optical axis 822.

An external ring 828 may be coupled to the housing 812 and may be configured to rotate about the optical axis 822 to rotate the knob 818 about the axis of rotation 823, thereby causing movement of the internal movable barrel 820 and the movable internal lens 816 along the optical axis 822. The external ring 828 may be configured to rotate about the optical axis 822 when a mounting plate 830 of the adjustable lens module 810 is coupled to the lens barrel of the image capture device (e.g., a lip 842 of the mounting plate 830 may be configured to releasably engage the bayonet 638 of the lens barrel 606). As a result, adjustment of the movable internal lens 816 may be possible by a user when the adjustable lens module 810 is attached to the image capture device.

Additionally, adjustment of the movable internal lens 816 may be possible via rotation of the external ring 828 when the external lens 814, the first fixed internal lens 815A, and the second fixed internal lens 815B remain stationary to avoid misalignment of the aforementioned lenses. For example, the external lens 814 may be retained within the internal fixed barrel 824 by a retaining ring 846 coupled to the housing 812 so that the external lens 814 remains stationary and aligned with the movable internal lens 816 along the optical axis 822 during movement of the movable internal lens 816 along the optical axis 822.

The knob 818 may be configured to directly or indirectly engage the internal movable barrel 820 to move the internal movable barrel 820 along the optical axis 822. The knob 818 may be directly coupled to the internal movable barrel 820 or an intermediate component may be located therebetween that receives movement of the knob 818 (e.g., rotation about the axis of rotation 823) and transfers such movement to the internal movable barrel 820.

By way of example, the knob 818 may include a first engaging portion 848A that is configured to engage teeth of the external ring 828 and a second engaging portion 848B that is configured to engage teeth of an internal ring 850 of the adjustable lens module 810 located between the knob 818 and the internal movable barrel 820. As a result, rotation of the external ring 828 about the optical axis 822 may cause rotation of the knob 818 about the axis of rotation 823, which may thereby cause rotation of the internal ring 850 about the optical axis 822 to move the internal movable barrel 820 along the optical axis 822. As a result, a user may manually rotate the external ring 828 to indirectly move the position of the movable internal lens 816 along the optical axis 822.

The internal ring 850 may be coupled to the housing 812 and configured to rotate about the optical axis 822 based upon rotation of the external ring 828 about the optical axis 822. As mentioned above, the internal movable barrel 820 includes the movable internal lens 816 and may be coupled to the internal ring 850 so that the internal movable barrel 820 may be configured to move axially along the optical axis 822 based upon rotation of the internal ring 850. The internal movable barrel 820 may be configured to move axially towards and away from the lens barrel along the optical axis 822 based upon rotation of the internal ring 850.

The external ring 828 and the internal ring 850 may be coupled to the knob 818 located therebetween so that the knob 818 may be configured to rotate the internal ring 850 about the optical axis 822 based upon rotation of the external ring 828. The knob 818 may be configured to engage the internal ring 850 so that rotation of the knob 818 (e.g., caused by rotation of the external ring 828) may be configured to rotate the internal ring 850 about the optical axis 822 and move the internal movable barrel 820 along the optical axis 822. That is, the knob 818 may be configured to rotate about the axis of rotation 823 based upon rotation of the external ring 828, whereby the axis of rotation 823 may be substantially orthogonal to the optical axis 822 or may form any desired angle with the optical axis 822.

While the adjustable lens module 710 discussed with respect to FIG. 7 includes the external ring 728 directly engaged to the internal movable barrel 720, the adjustable lens module 810 of FIG. 8 may facilitate indirect movement of the internal movable barrel 820 by the external ring 828 via the knob 818 and the internal ring 850. The housing 812 may substantially contain the internal movable barrel 820 and the movable internal lens 816 and prevent environmental degradation. That is, the knob 818 may extend through the housing 812 to engage the internal ring 850 to decrease the overall gaps or spaces between external components of the adjustable lens module 810 that may require a seal. As a result, the internal movable barrel 820 and the movable internal lens 816 may be protected from rain and/or debris that may enter the adjustable lens module 810.

The internal movable barrel 820 and the internal ring 850 may be disposed within the housing 812. The housing 812 may be coupled to the lens barrel (e.g., the lens barrel 606 of FIG. 6) of the image capture device, such as with the mounting plate 830, so that operation of the adjustable lens module 810 may still be possible when the adjustable lens module 810 is coupled to the lens barrel. That is, the housing 812 may be configured to remain stationary and coupled to the lens barrel when the external ring 828, the knob 818, and the internal ring 850 are operated to move the internal movable barrel 820. The housing 812 may be configured to remain stationary when the external ring 828 and the internal ring 850 are rotated and when the internal movable barrel 820 moves axially along the optical axis 822. For example, the housing 812 may include an annular groove 852 along an outer surface that may be configured to align with and guide a male portion 854 of the external ring 828 so that, while the housing 812 remains stationary, the external ring 828 may rotate about the optical axis 822 along the outer surface of the housing 812 via the annular groove 852 of the housing 812.

The adjustable lens module 810 may be configured to move the movable internal lens 816 in a focus direction 860 along the optical axis 822 to adjust the focus of an image or video captures through the adjustable lens module 810 and the lens barrel. That is, rotation of the external ring 828 by a user may be configured to move the movable internal lens 816 towards and away from one or more lenses of the lens barrel (e.g., the lens 608 of FIG. 6) along the optical axis 822 to adjust the focus and ensure the image or video being captured is clear. As a result, the adjustable lens module 810 may be configured to modify a physical position of the movable internal lens 816 along the optical axis 822 to provide the user with further adjustability of the image capture device using the adjustable lens module 810 yet still ensure that the adjustable lens module 810 is aligned with the lens barrel along the optical axis 822. That is, the movable internal lens 816 may be configured to move along the optical axis 822 by the user rotating the external ring 828 yet the external lens 814, the first fixed internal lens 815A, the second fixed internal lens 815B, and the movable internal lens 816 may remain aligned along optical axis 822 even during movement of the movable internal lens 816.

Figure 9:
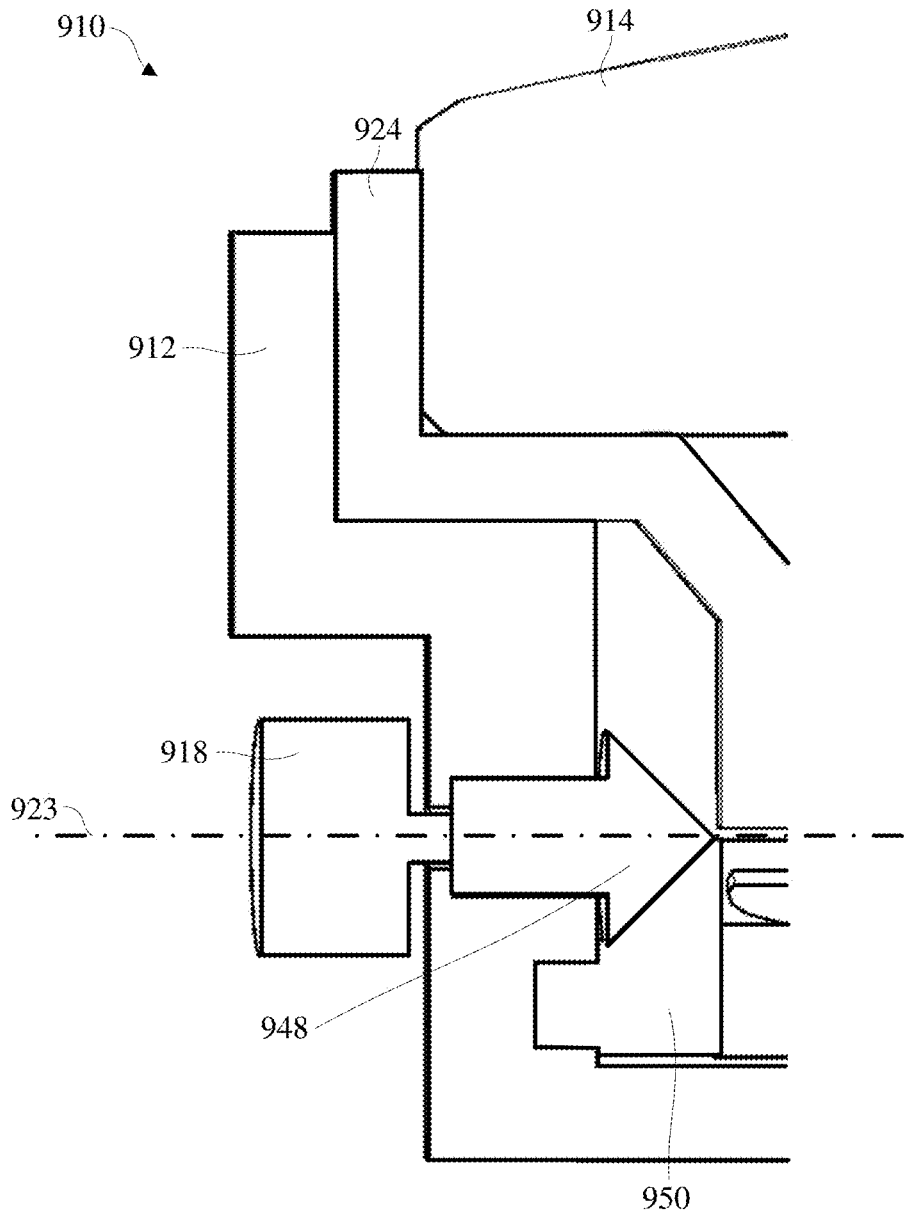
FIG. 9 is a partial cross-sectional view of an adjustable lens module.

FIG. 9 illustrates a partial cross-sectional view of an adjustable lens module 910. The adjustable lens module 910 may be similar to the adjustable lens modules 610, 710, and 810 of FIGS. 6-8. Additionally, the adjustable lens module 810 may be coupled to a lens barrel, such as the lens barrel 606 of FIG. 6. The partial cross-sectional view of the adjustable lens module 910 has omitted portions of the adjustable lens module 910 for clarity and simplicity.

The adjustable lens module 910 may include a housing 912 similar to the housing 812, an external lens 914 similar to the external lens 814, and an internal fixed barrel 924 similar to the internal fixed barrel 824. The external lens 914 and the internal fixed barrel 924 are disposed in the housing 912. Additionally, the adjustable lens module 910 may include a knob 918 that includes an engaging portion 948 configured to engage an internal ring 950 located within the housing 912.

Similar to the operation of the adjustable lens module 810, the adjustable lens module 910 may be configured to move an internal movable barrel containing a movable internal lens (e.g., similar to the internal movable barrel 820 and the movable internal lens 816) to adjust the focus of an image or video being captured through the adjustable lens module 910 by an image capture device coupled to or that includes the adjustable lens module 910. That is, the movable internal lens of the adjustable lens module 910 may be configured to move along an optical axis (e.g., similar to the optical axis 822) towards and away from a lens barrel of the image capture device. Similarly, the movable internal lens may be configured to move towards and away from the external lens 914 along the optical axis.

While the adjustable lens module 810 includes the external ring 828 that may be manually rotated about the optical axis 822 to rotate the knob 818, the adjustable lens module 910 may be free of an external ring such as the external ring 828 of FIG. 8. To move the movable internal lens of the adjustable lens module 910, the user may grasp the knob 918 and rotate the knob 918 about an axis of rotation 923. As the knob 918 rotates, the engaging portion 948 of the knob 918 may engage the internal ring 950 and cause the internal ring 950 to rotate about the optical axis, thereby moving the movable internal lens along the optical axis to adjust the focus of the image and/or video being captured. Engagement or execution of motion between the engaging portion 948 of the knob 918 and the internal ring 950 may vary. For example, teeth of the engaging portion 948 may mesh with teeth of the internal ring 950 so that rotation of the knob 918 along the axis of rotation 923 causes rotation of the internal ring 950 about the optical axis. The optical axis may be substantially orthogonal to the axis of rotation 923 of the knob 918. Alternatively, the engaging portion 948 of the knob 918 may drive rotation of the internal ring 950 using one or more mechanical interlocks other than teeth. The external ring 828 of FIG. 8 may be eliminated in use of the knob 918 of FIG. 9 in a manner that decreases the overall packaging size of the adjustable lens module 910 to provide a simplified configuration.

Additionally, the knob 918 is not particularly limited to any configuration. For example, the knob 918 may be a one-piece design (e.g., an interface portion for the user may be monolithically formed with the engaging portion 948) or a two-piece design (e.g., the interface portion for the user may be coupled to the engaging portion 948). For example, the external portion of the knob 918, that is, the interface portion, may extend through the housing 912 and may be threaded into the engaging portion 948 to form the knob 918.

Figure 10:
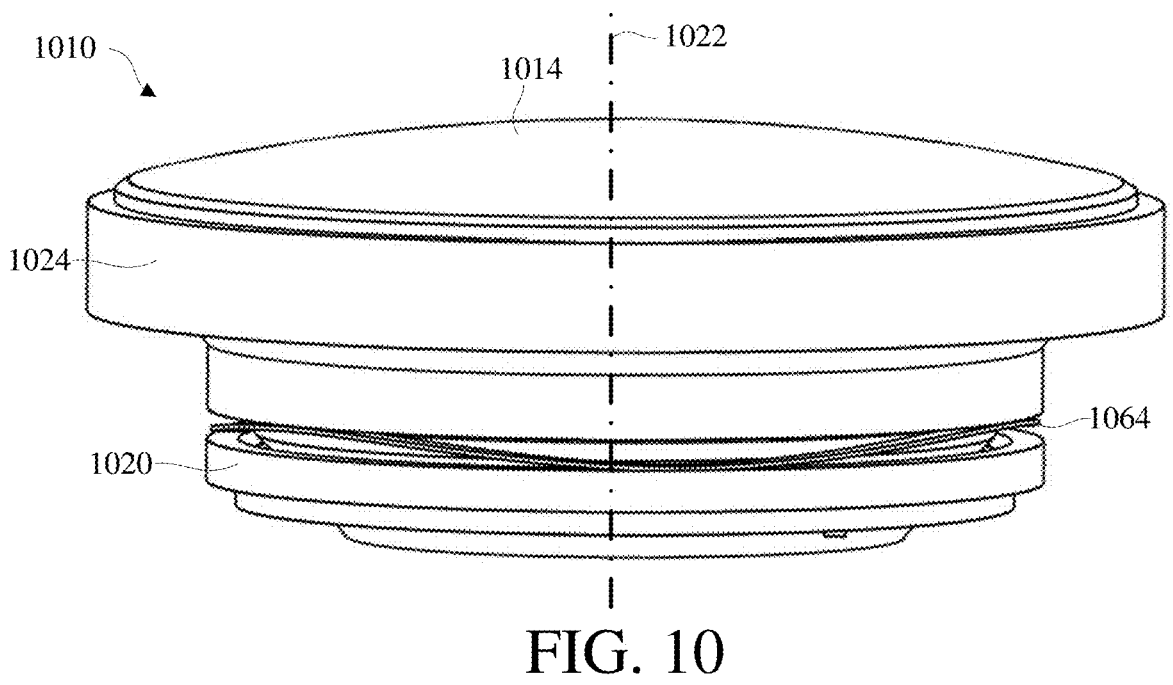
FIG. 10 is an isometric view of an adjustable lens module with the housing removed.

FIG. 10 illustrates an isometric view of an adjustable lens module 1010. The adjustable lens module 1010 may be similar to the adjustable lens modules 610, 710, and 810 of FIGS. 6-8. Additionally, the adjustable lens module 810 may be coupled to a lens barrel, such as the lens barrel 606 of FIG. 6. The housing (e.g., similar to the housing 812 of FIG. 8) of the adjustable lens module 1010 has been removed to better illustrate the internal components of the adjustable lens module 1010.

The adjustable lens module 1010 may include an external lens 1014, an internal movable barrel 1020 movable along an optical axis 1022, and an internal fixed barrel 1024. The external lens 1014 may be coupled to the internal fixed barrel 1024 so that, during movement of the internal movable barrel 1020 along an optical axis of the adjustable lens module 1010, the external lens 1014 and the internal fixed barrel 1024 may remain stationary. The internal movable barrel 1020 may be configured to move axially towards and away from the internal fixed barrel 1024 along the optical axis 1022 to adjust a position of a movable internal lens (e.g., similar to the movable internal lens 816) and thereby adjust the focus of an image and/or video captured by the image capture device.

An annular biasing element 1064 may be disposed between the internal movable barrel 1020 and the internal fixed barrel 1024. The annular biasing element 1064 may be configured to bias the internal movable barrel 1020 against the lens barrel (e.g., the lens barrel 606 of FIG. 6) of the image capture device. The annular biasing element 1064 may be configured to bias the internal movable barrel 1020 towards the lens barrel so that an angle (e.g., a tilt) of the internal movable barrel 1020 with respect to the optical axis 1022 may be maintained. For example, the annular biasing element 1064 may be configured to bias the internal movable barrel 1020 towards or again the lens barrel so that the internal movable barrel 1020 may be substantially orthogonal to the optical axis 1022. That is, a surface of the internal movable barrel 1020 that abuts the annular biasing element 1064 may be substantially orthogonal to the optical axis 1022 before, during, and after movement of the internal movable barrel 1020.

The annular biasing element 1064 may extend annularly around all or a portion the optical axis 1022 of the image capture device. For example, the annular biasing element 1064 may extend around a circumference or perimeter of the internal movable barrel 1020 and/or the internal fixed barrel 1024. The annular biasing element 1064 may also be any desired configuration or type of biasing element. The annular biasing element 1064 may be a compressible member, a memory shape alloy, an elastic member, or a combination thereof. By way of example, the annular biasing element 1064 may be a wave spring having one or more undulations along the annular biasing element 1064 to maintain the tile of the internal movable barrel 1020. Thus, the annular biasing element 1064 may help maintain a position of the internal movable barrel 020, thereby maintain axial alignment between the external lens 1014, the lens barrel, and the movable internal lens disposed in the internal movable barrel 1020.

Figure 11:
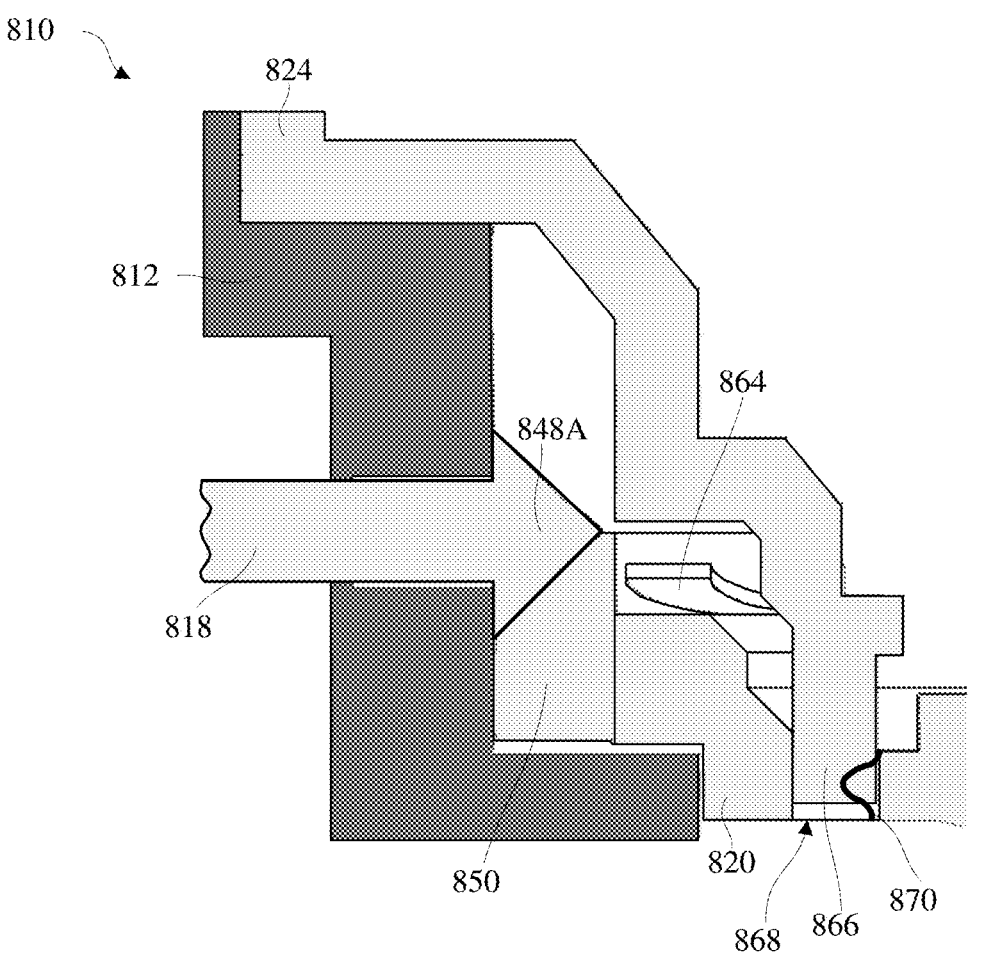
FIG. 11 is a close-up cross-sectional view of the adjustable lens module of FIG. 8.

FIG. 11 is a close-up cross-sectional view of the adjustable lens module 810 of FIG. 8. As discussed with respect to FIG. 8, the adjustable lens module 810 includes the housing 812, the knob 818, the internal movable barrel 820, the internal fixed barrel 824, and the internal ring 850. The knob 818 may be configured to rotate (e.g., by rotating the external ring 828) so that the first engaging portion 848A of the knob 818 may in turn rotate the internal ring 850. As the internal ring 850 rotates, the internal movable barrel 820 may be configured to move axially along the optical axis 822 of the adjustable lens module 810.

Additionally, the adjustable lens module 810 may include an annular biasing element 864 that may be similar to the annular biasing element 1064 discussed above. The annular biasing element 864 may be disposed between the internal movable barrel 820 and the internal fixed barrel 824. Similar to the annular biasing element 1064, the annular biasing element 864 may be configured to bias the internal movable barrel 820 against the lens barrel (e.g., the lens barrel 606) of the image capture device to prevent tilting of the internal movable barrel 820 within the housing 812 and maintain alignment between the internal movable barrel 820 and the internal fixed barrel 824.

To further maintain alignment between the internal movable barrel 820 and the internal fixed barrel 824, the internal fixed barrel 824 may include a projection 866 that extends into a hole 868 of the internal movable barrel 820 to axially align the internal fixed barrel 824 and the internal movable barrel 820 along the optical axis 822. The projection 866 may be disposed in the hole 868 before movement of the internal movable barrel 820, during movement of the internal movable barrel 820, after movement of the internal movable barrel 820, or a combination thereof. The projection 866 may be any size and/or shape that may be received by the hole 868. For example, the projection 866 may have a diameter substantially similar or smaller than a diameter of the hole 868.

Additionally, a radial biasing element 870 may be disposed in the hole 868 of the internal movable barrel 820 to bias the internal fixed barrel 824 and maintain axial alignment between the internal fixed barrel 824 and the internal movable barrel 820 along the optical axis 822. It should be noted that the radial biasing element 870 may be any type of biasing element, such as a spring (e.g., a wave spring or helical spring), elastic member, compressible member, or a combination thereof.

Figure 12:
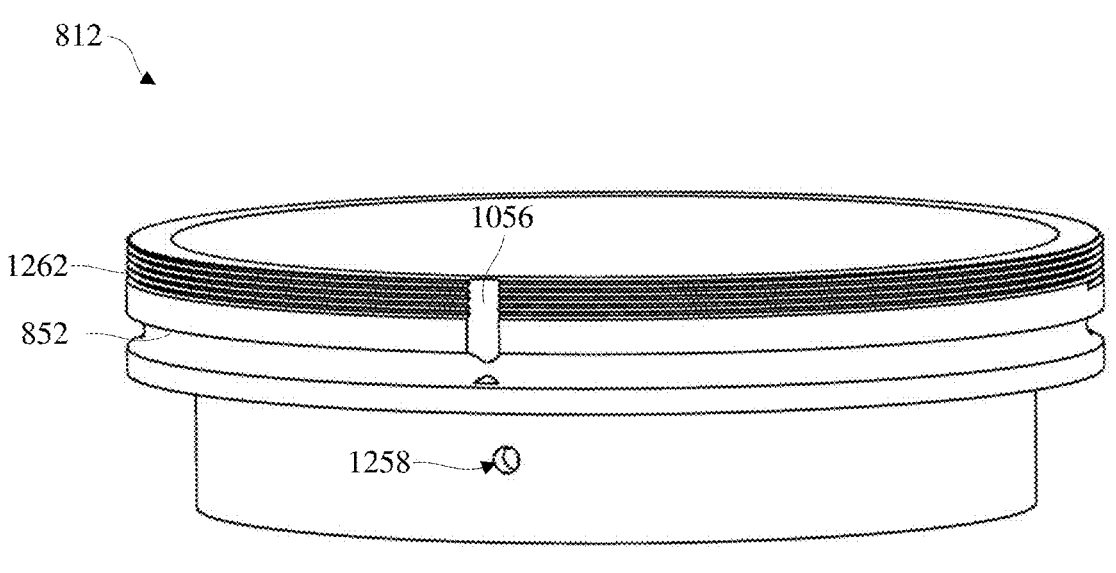
FIG. 12 is an isometric view of a housing of an adjustable lens module.
Figure 13:
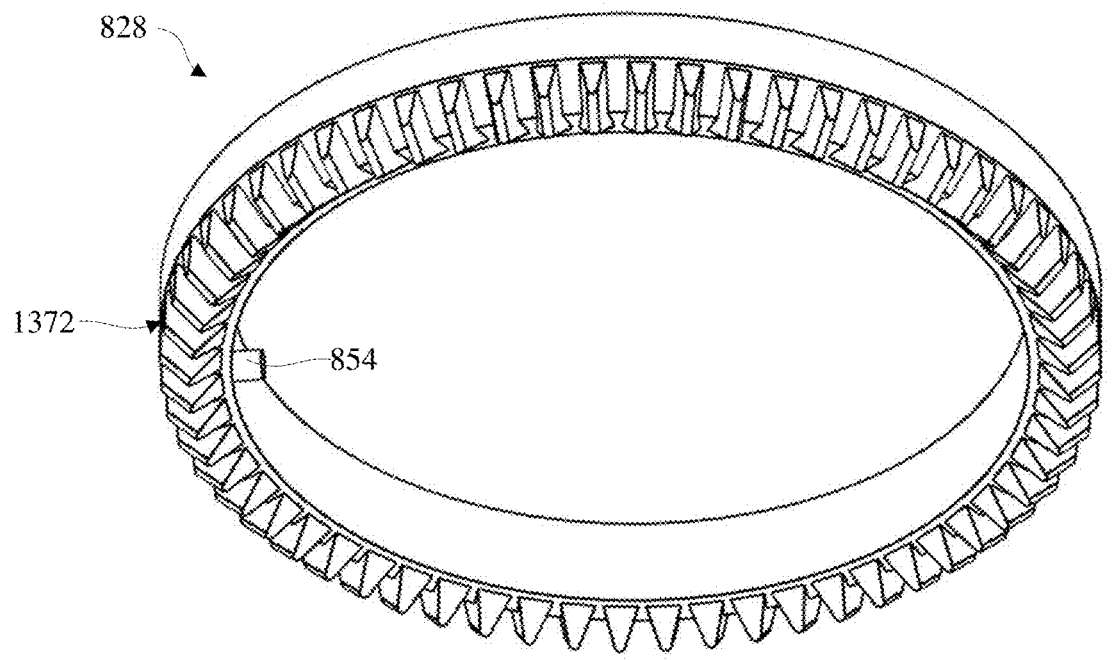
FIG. 13 is an isometric view of an external ring of an adjustable lens module.

FIG. 12 is an isometric view of the housing 812 of the adjustable lens module 810 described above. Additionally, FIG. 13 is an isometric view of the external ring 828 of the adjustable lens module 810 that may be configured to engage the housing 812.

The housing 812 of the adjustable lens module 810 may include an annular groove 852 that is configured to receive the male portion 854 of the external ring 828. During rotation of the external ring 828 about the optical axis 822, the male portion 854 of the external ring 828 may be guided along the annular groove 852 to maintain an axial position of the external ring 828 along the optical axis 822. The external ring 828 may be coupled to the housing 812 by inserting the male portion 854 into an axial groove 1056 of the housing 812 until the male portion 854 reaches the annular groove 852. Once the male portion 854 is inserted into the axial groove 1056 of the housing 812, the axial position of the external ring 828 may be maintained during rotation of the external ring 828 about the optical axis 822.

For example, the external ring 828 may include teeth 1372 that may engage the first engaging portion 848A of the knob 818 so that rotation of the external ring 828 may cause rotation of the knob 818. The teeth 1372 may be any size and/or shape to engage the knob 818 and may be spaced apart any desired amount. Additionally, the external ring 828 may be free of teeth and may engage the knob 818 in another manner.

The housing 812 may also a hole 1258 within a wall of the housing 812. The knob 818 may extend through the hole 1258 of the housing 812 to engage both the external ring 828 and the internal ring 850. For example, a central portion (e.g., a shaft) of the knob 818 may extend through the hole 1258 so that the first engaging portion 848A is positioned on an external side of the housing 812 to engage the external ring 828 and the second engaging portion 848B is positioned on an internal side of the housing 812 to engage the internal ring 850. It should be noted that one or more seals may be disposed around the knob 818 within or adjacent to the hole 1258 to seal a gap between the knob 818 and the hole 1258 to prevent fluids and/or debris from entering the adjustable lens module 810 through the hole 1258. Furthermore, the housing 812 may include threading 1262 that may be configured to secure the retaining ring 846 of the adjustable lens module 810 to thereby maintain a position of the external lens 814 of the adjustable lens module 810.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a lens barrel disposed in a body of the image capture device; and
   an adjustable lens module coupled to the lens barrel and that includes:
   a housing;
   an external ring coupled to the housing and configured to rotate about an optical axis;
   an internal ring coupled to the housing and configured to rotate about the optical axis based upon rotation of the external ring about the optical axis;
   a knob located between and coupled to the external ring and the internal ring, wherein the knob is configured to rotate the internal ring about the optical axis based upon rotation of the external ring; and
   an internal movable barrel that includes a movable internal lens, is coupled to the internal ring, and is configured to move axially along the optical axis based upon rotation of the internal ring.

2. The image capture device of claim 1, wherein the internal movable barrel is configured to move axially towards and away from the lens barrel along the optical axis based upon rotation of the internal ring.

3. The image capture device of claim 1, wherein the knob extends through the housing to engage the internal ring.

4. The image capture device of claim 1, wherein the knob includes a first engaging portion that is configured to engage teeth of the external ring and a second engaging portion that is configured to engage teeth of the internal ring.

5. The image capture device of claim 4, wherein the knob extends through a hole of the housing to engage both the external ring and the internal ring.

6. The image capture device of claim 1, wherein the knob is configured to rotate about an axis of rotation based upon rotation of the external ring, and wherein the axis of rotation is substantially orthogonal to the optical axis.

7. The image capture device of claim 1, wherein the adjustable lens module further includes an internal fixed barrel that is disposed in the housing and positioned outward along the optical axis from the internal movable barrel with respect to the lens barrel of the image capture device.

8. The image capture device of claim 7, wherein the adjustable lens module further includes a mounting plate that is configured to couple the adjustable lens module to the lens barrel.

9. The image capture device of claim 8, wherein the mounting plate is coupled to the housing of the adjustable lens module and configured to engage a bayonet of the lens barrel.

10. The image capture device of claim 9, wherein the mounting plate includes a lip that is configured to engage one or more fingers of the bayonet to couple the adjustable lens module to the lens barrel.

11. The image capture device of claim 1, wherein the adjustable lens module is coupled to the lens barrel so that the adjustable lens module and the lens barrel are axially aligned along the optical axis.

12. The image capture device of claim 1, wherein the housing of the adjustable lens module includes an annular groove that is configured to receive a male portion of the external ring so that, during rotation of the external ring about the optical axis, the male portion of the external ring is guided along the annular groove.

13. An adjustable lens module for an image capture device, the adjustable lens module comprising:

an internal movable barrel;

a movable internal lens disposed in the internal movable barrel and configured to axially align with an optical axis of a lens barrel of the image capture device, wherein the movable internal lens is configured to be positioned inward of an outer surface of the adjustable lens module;

a ring coupled to the internal movable barrel and configured to rotate with respect to the internal movable barrel about the optical axis of the lens barrel, wherein rotation of the ring is configured to move the internal movable barrel and the movable internal lens axially along the optical axis of the lens barrel; and a knob configured to engage the ring, wherein rotation of the knob is configured to rotate the ring about the optical axis.

14. The adjustable lens module of claim 13, further comprising a housing, wherein the internal movable barrel and the ring are disposed within the housing and the housing is configured to be coupled to the lens barrel.

15. The adjustable lens module of claim 14, wherein the housing is configured to remain stationary when the ring is rotated and when the internal movable barrel moves axially along the optical axis.

16. The adjustable lens module of claim 13, wherein the internal movable barrel is configured to move axially towards and away from the lens barrel along the optical axis based upon rotation of the ring.

17. The image capture device of claim 13, further comprising a mounting plate that is coupled to the adjustable lens module and configured to engage the lens barrel of the image capture device.

18. An image capture device, comprising:

a lens barrel disposed in a body of the image capture device and that includes one or more lenses disposed in the lens barrel; and an adjustable lens module coupled to the lens barrel and that includes:

an internal fixed barrel that includes one or more fixed internal lenses, wherein the one or more fixed internal lenses axially align with the one or more lenses of the lens barrel along an optical axis of the lens barrel;

an internal movable barrel;

a movable internal lens disposed in the internal movable barrel, wherein the movable internal lens axially aligns with the one or more lenses of the lens barrel along the optical axis of the lens barrel;

a ring coupled to the internal movable barrel and configured to rotate with respect to the internal movable barrel about the optical axis, wherein rotation of the ring is configured to move the movable internal lens axially towards and away from the one or more lenses of the lens barrel along the optical axis; and an annular biasing element disposed between the internal movable barrel and the internal fixed barrel and configured to bias the internal movable barrel against the lens barrel of the image capture device.

19. The image capture device of claim 18, wherein the annular biasing element is a wave spring.

20. The image capture device of claim 18, wherein the internal fixed barrel includes a projection that extends into a hole of the internal movable barrel to axially align the internal fixed barrel and the internal movable barrel along the optical axis, and wherein a radial biasing element is disposed in the hole of the internal movable barrel to bias the internal fixed barrel and maintain axial alignment between the internal fixed barrel and the internal movable barrel along the optical axis.

* * * * *